(12) United States Patent
Pelissier et al.

(10) Patent No.: US 9,983,627 B1
(45) Date of Patent: May 29, 2018

(54) HINGE FOR A COMPUTING DEVICE WITH TWO DISPLAY DEVICES

(71) Applicant: Dell Products L. P., Round Rock, TX (US)

(72) Inventors: Gerald R. Pelissier, Mendham, NJ (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days. days.

(21) Appl. No.: 15/482,950

(22) Filed: Apr. 10, 2017

(51) Int. Cl.
| | | |
|---|---|---|
| *H05K 7/00* | (2006.01) | |
| *H05K 5/00* | (2006.01) | |
| *G06F 1/16* | (2006.01) | |
| *E05D 7/00* | (2006.01) | |
| *E05D 11/00* | (2006.01) | |
| *E05D 11/10* | (2006.01) | |

(52) U.S. Cl.
CPC .............. *G06F 1/1649* (2013.01); *E05D 7/00* (2013.01); *E05D 11/0081* (2013.01); *E05D 11/105* (2013.01); *G06F 1/1618* (2013.01); *G06F 1/1681* (2013.01); *E05D 2011/1092* (2013.01); *E05Y 2900/606* (2013.01)

(58) Field of Classification Search
CPC .......................................................... G06F 3/14
USPC ..................................................... 361/679.02
See application file for complete search history.

(56) References Cited

U.S. PATENT DOCUMENTS

2015/0277496 A1\* 10/2015 Reeves ................. G06F 1/1641
345/1.2
2016/0085271 A1\* 3/2016 Morrison .............. G06F 1/1681
361/679.27

\* cited by examiner

*Primary Examiner* — Jerry Wu
(74) *Attorney, Agent, or Firm* — Campbell Stephenson LLP; Shiv S. Naimpally

(57) ABSTRACT

A computing device may include a first housing and a second housing attached by one or more hinges. The first housing may house a first set of components, including a first display device. The second housing may house a second set of components, including a second display device. The one or more hinges may enable the first housing and the second housing to be placed at an angle of between about 0 degrees to about 360 degrees relative to each other. When the first housing is placed at an angle of about 180 degrees relative to the second housing, the one or more hinges may pull the first housing and the second housing towards each other, resulting in a gap between a first edge of the first housing and a second edge of the second housing of 2 millimeters or less.

20 Claims, 15 Drawing Sheets

US 9,983,627 B1

HINGE FOR A COMPUTING DEVICE WITH TWO DISPLAY DEVICES

BACKGROUND OF THE INVENTION

Field of the Invention

This invention relates generally to computing devices with two display devices and, more particularly, to a hinge that can rotate approximately 360 degrees and, when the hinge is at approximately 180-degrees, bring the two display devices close to each other (e.g., 4 millimeters (mm) or less).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many portable computing devices, such as laptops, may include a display device in a first housing and one or more input devices (e.g., keyboard, touchpad, and the like) in a second housing. The first housing may be connected to the second housing using a hinge. Some laptops may provide 2-in-1 functionality using hinges that can position the two housings at 360 degrees relative to each other. For example, the computing device may be used as a conventional laptop when the two housings are positioned at 180-degrees or less relative to each other and the computing device may be used as a tablet when the two housings are positioned at 360 degrees relative to each other. When the first housing includes a display device and the second housing includes one or more input devices, the distance between the two housings at various angles between 0 and 360 degree may not be particularly important to the user. However, in a portable computing device in which the first housing includes a first display device and the second housing includes a second display device, the distance between the two housings may be important to the user.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A computing device may include a first housing and a second housing attached by one or more hinges. The first housing may house a first set of components, including a first display device. The second housing may house a second set of components, including a second display device. The one or more hinges may enable the first housing and the second housing to be placed at an angle of between about 0 degrees to about 360 degrees relative to each other. When the first housing is placed at an angle of about 180 degrees relative to the second housing, the one or more hinges may pull the first housing and the second housing towards each other, resulting in a gap between a first edge of the first housing and a second edge of the second housing of 2 millimeters or less.

BRIEF DESCRIPTION OF THE DRAWINGS

A more complete understanding of the present disclosure may be obtained by reference to the following Detailed Description when taken in conjunction with the accompanying Drawings. In the FIGS., the left-most digit(s) of a reference number identifies the FIG. in which the reference number first appears. The same reference numbers in different FIGS. indicate similar or identical items.

DETAILED DESCRIPTION

Figure 1:
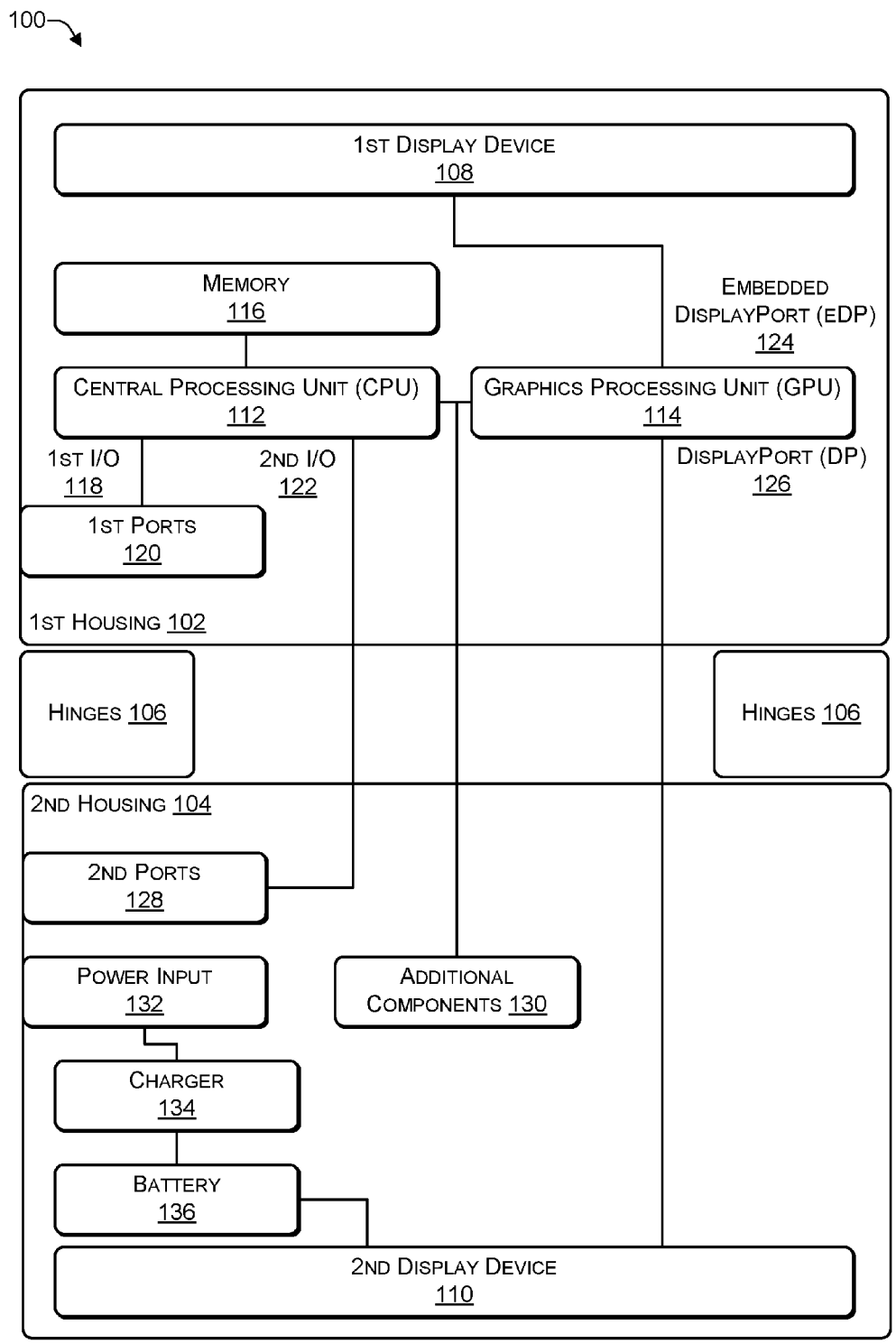
FIG. 1 is a block diagram of an internal architecture of a computing device that includes two display devices (e.g., a dual-display device) according to some embodiments.

For purposes of this disclosure, an information handling system (e.g., a computing device) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may enable a tablet computing device with two display devices connected to each other by one or more hinges to be positioned in a way that enables a user to utilize the two display devices in a manner similar to a single, larger display device. For example, the hinges may enable the two display devices to rotate relative to each other from between about 0 degrees to about 360 degrees. When the two display devices are placed approximately 180-degrees to each other, the user may desire to have the two display devices fairly close to each other, e.g., such that the two display devices appear (and behave) similar to a single display device. In this way, the tablet computing device may be relatively compact (e.g., 8"×5") when the two display devices are about 0 degrees (e.g., closed position) to enable the computing device to be easily stored and transported. When the user opens the tablet computing device and places the two display devices approximately 180-degrees relative to each other, the long edge of the first display device may be placed close (e.g., 4 mm or less) to the long edge of the second display device, enabling the user to use the two display devices as if they were a single larger (e.g., 8"×10") display device. For example, positioning the two display devices approximately 180-degrees relative to each other may enable the user to work on documents, presentations, or spreadsheets, view videos, and the like using about double the surface area as compared to each individual display device.

To enable the two display devices to appear as (and to be used as) a single, large display device when the two display devices are approximately 180-degrees relative to each other, a bezel around each display device may be relatively narrow (e.g., 2 mm or less), at least along the long edge to which the hinge is attached. In addition, the hinges may use a mechanism (as described herein) to draw the long edges of the two display devices close to each other when the display devices are positioned approximately 180-degrees to each other, to enable the gap between the long edge of the first display device and the long edge of the second display device to be relatively small.

As a first example, a computing device may include a first housing coupled to a second housing by one or more hinges. The first housing may house a first set of components, including a first display device. The second housing may house a second set of components, including a second display device. The one or more hinges may enable the first housing to be placed at an angle of between about 0 degrees to about 360 degrees relative to the second housing. Placing the first housing at an angle of about 180 degrees relative to the second housing may cause the one or more hinges to (i) pull the first housing 2 millimeters (or less) towards the second housing and (ii) pull the second housing 2 millimeters (or less) towards the second housing, causing a gap between a first edge of the first housing and a second edge of the second housing to be 2 millimeters or less and causing a gap between a first particular edge of the first display device and a second particular edge of the second display device to be 4 millimeters or less. An individual hinge of the one or more hinges may include: (i) a first bracket attached to the first housing, (ii) a second bracket attached to the second housing, (iii) a first bracket holder that is attached to the first bracket, and (iv) a second bracket holder that is attached to the second bracket. The individual hinge may also include: (i) a first spring in which a first end of the first spring is attached to the first bracket and a second end of the first spring is attached to the first bracket holder, and (ii) a second spring in which the first end of the second spring is attached to the second bracket and the second end of the second spring is attached to the second bracket holder. Placing the first housing at the angle of about 180 degrees relative to the second housing may cause the first spring to exert a predetermined amount of force on the first bracket holder, thereby pulling the first edge of the first housing towards the second housing and cause the second spring to exert the predetermined amount of force on the second bracket holder, thereby pulling the second edge of the second housing towards the first housing. The individual hinge may also include: (i) a first position pin attached to the first bracket holder, (ii) a first slot in the first bracket in which the first position pin moves from a first end of the first slot to a second end of the first slot based on the angle between the first housing and the second housing, (iii) a second position pin attached to the second bracket holder, and (iv) a second slot in the second bracket in which the second position pin moves from the first end of the second slot to the second end of the second slot based on the angle between the first housing and the second housing.

As a second example, a computing device may include a first housing coupled to a second housing by at least one hinge. The first housing may include a first set of components (e.g., processors, memory, sensors, and the like) including a first display device. The second housing may include a second set of components (battery, battery charger, sensors, and the like) including a second display device. The at least one hinge may enable the first housing to be placed at an angle of between about 0 degrees to about 360 degrees relative to the second housing. For example, placing the first housing at an angle of about 180 degrees relative to the second housing may cause the one or more hinges to pull a first edge of the first housing 2 millimeters (or less) towards the second housing and pull a second edge of the second housing 2 millimeters (or less) towards the second housing. The at least one hinge may include one or more conduits through which at least one cable is routed. For example, the at least one cable may carry power from a power source in the second housing to the first set of components in the first housing. The at least one cable may carry one or more data signals between the first set of components in the first housing and the second set of components in the second housing. The at least one hinge may include a plurality of detents associated to temporarily hold the first housing at an angle relative to the second housing. For example, the at least one hinge may include detents at angles of about 0 degrees, about 90 degrees, about 180 degrees, and about 360 degrees. The at least one hinge may include a locking mechanism to enable the at least one hinge to temporarily lock the first housing and the second housing at a first particular angle. A button (or other mechanism) may be used to unlock the locking mechanism when changing the angle of the first housing relative to the second housing from the first particular angle to a second particular angle.

As a third example, a computing device may include a first housing coupled to a second housing by one or more hinges. The first housing may be used to house a first set of components and the second housing may be used to house a second set of components. The one or more hinges may enable the first housing and the second housing to be placed at an angle of between about 0 degrees to about 360 degrees relative to each other. Placing the first housing at an angle of about 180 degrees relative to the second housing may cause the two housings to be pulled closer to each other, such that a gap between a first edge of the first housing and a second edge of the second housing is 2 millimeters (or less). For example, placing the first housing and the second housing at an angle of about 180 degrees relative to each other may cause the one or more hinges to: (i) pull the first edge of the first housing 2 millimeters or less towards the second housing, and (ii) pull the second edge of the second housing 2 millimeters or less towards the first housing. The first set of components may include a graphics processing unit (GPU) and a first display device connected to an embedded DisplayPort (eDP) output of the GPU. The second set of components may include a second display device connected to a DisplayPort (DP) output of the GPU. An individual hinge of the one or more hinges may include: (i) a first bracket attached to the first housing, (ii) a second bracket attached to the second housing, (iii) a first bracket holder that is attached to the first bracket, and (iv) a second bracket holder that is attached to the second bracket. The individual hinge may also include a first spring in which a first end of the first spring is attached to the first bracket and a second end of the first spring is attached to the first bracket holder, and a second spring in which the first end of the second spring is attached to the second bracket and the second end of the second spring is attached to the second bracket holder. Placing the first housing at the angle of about 180 degrees relative to the second housing may (i) cause the first spring to exert a predetermined amount of force on the first bracket holder, thereby pulling the first edge of the first housing towards the second housing, and (ii) cause the second spring to exert the predetermined amount of force on the second bracket holder, thereby pulling the second edge of the second housing towards the first housing. The individual hinge may also include (i) a first position pin attached to the first bracket holder, (ii) a first slot in the first bracket in which the first position pin moves from a first end of the first slot to a second end of the first slot based on the angle between the first housing and the second housing, (iii) a second position pin attached to the second bracket holder, and (iv) a second slot in the second bracket in which the second position pin moves from the first end of the second slot to the second end of the second slot based on the angle between the first housing and the second housing.

FIG. 1 is a block diagram of an internal architecture 100 of a computing device that includes two display devices (e.g., a dual-display device) according to some embodiments. The computing device 100 may include a first housing 102 coupled to a second housing 104 via one or more hinges 106. The hinges 106 may enable the two housings 102, 104 to be positioned at different angles (e.g., between about 0 to about 360 degrees) relative to each other and in different orientations (e.g., vertical orientations and horizontal orientations). A first display device 108 may be located in the first housing 102 and a second display device 110 may be located in the second housing 104. For example, the display devices 108, 110 may use a technology such as liquid crystal display (LCD), light emitting diode (LED), organic LED (OLED), electronic paper (e-paper), electronic ink (e-ink), or the like.

A first portion of the components of the computing device 100 may be located in the first housing 102 (e.g., behind the first display device 108) while a remaining portion of the components of the computing device 100 may be located in the second housing 104 (e.g., behind the second display device 110). For example, as illustrated in FIG. 1, the components located in the first housing 102 may include at least one central processing unit (CPU) 112, a graphics process unit (GPU) 114, and a memory (e.g., computer-readable media) 114. The GPU 114 may be integrated into the CPU 112 or may be a separate device from the GPU 114. The CPU 112 and GPU 114 may be connected to a first input/output (I/O) bus 118 that provides a first set of one or more I/O ports 120 in the first housing 102 and a second I/O bus 122 that is connected to the second housing to provide a second set of one or more ports 128. For example, the ports 120, 128 may include video ports, such as a video graphics adapter (VGA) port, a digital video interface (DVI) port, a high definition media interface (HDMI) port, a Thunder-Bolt® port, audio ports (e.g., microphone jack, headphone, jack, and the like), another type of signal port, or any combination thereof. The ports 120, 128 may include one or more universal serial bus (USB) ports compliant with USB 2.0, USB 3.0, and the like. The ports 120, 128 may include an Ethernet port, audio I/O ports, and the like. The GPU 114 may include two or more lanes of an embedded DisplayPort (eDP) output 124 connected to the first display device 108 in the first housing and two or more lanes of a DisplayPort (DP) output 126 that is connected to the second display device 110 in the second housing 104.

The second housing 104 may include a remaining portion of the components of the computing device 100. For example, the remaining portion of the components may be located in the second housing 104 (e.g., behind the second display device 110). The second housing 104 may include additional components 130 (e.g., keyboard, touchpad, trackball, speaker, microphone, Wi-Fi antenna, Bluetooth antenna, cellular antenna, and the like), a power input 132 (e.g., alternating current (AC) or direct current (DC) input), a charger 134, and a battery 136. The battery charger 134 may also be used as a power source to provide power instead of (or in addition to) the battery 250, e.g., when the battery 136 is depleted or inoperable. A first power distribution bus in the first housing 102 may receive power from the battery 136 (or the charger 134) and distribute the power to the components in the first housing 102. A second power distribution bus in the second housing 104 may distribute power from the battery 136 (or the charger 134) to the components in the second housing 104. A cable threaded through one or more of the hinges 106 may be used to connect the first power distribution bus in the first housing 102 to the second power distribution bus in the second housing 104 and to the battery 136 and the charger 134.

In FIG. 1, the first set of components of the computing device 100 shown as being housed in the first housing 102 and the remaining set of components shown in the second housing 104 are purely for illustration purposes. Depending on the implementation, different components may be housed in each of the housings 102, 104. For example, when the computing device 100 is designed for graphics processing, the GPU 114 and supporting hardware (e.g., graphics support chips, graphics memory, and the like) may be housed in the second housing 104. As another example, in some cases, the ports 120, 128 may all be located in the first housing 102 or in the second housing 104 rather than being split between the two housings 102, 104. As a further example, the battery 136 may include multiple cells, with a portion of the cells located in the first housing 102 and a remaining portion of the cells located in the second housing 104. In some cases, which components of the computing device 100 are located in each of the housings 102, 104 may be determined on the thermal characteristics of the components. For example, the components may be distributed between the housings 102, 104 to enable each of the housings 102, 104 to heat up to approximately the same temperature. Doing so may avoid the situation where components that generate the most heat are grouped into the same housing, thereby causing one housing to be hotter than the other housing. Various sensors, such as a magnetometer, a compass, an inertial sensor, a global positioning satellite sensor, an accelerometer, a gyroscope, a compass, a barometer, an imaging sensor (e.g., camera with lens), or other type of sensor may be located in one or both of the housings 102, 104.

Thus, a computing device 100 may include the first housing 102 connected to the second housing 104 by one or more hinges 106. The hinges 106 may enable the first housing 102 and the second housing 104 to be placed at an angle between about 0 degrees to about 360 degrees. A first portion (e.g., first set) of components (e.g., 112, 114, 116, and 120) may be located in the first housing 102 (e.g., behind the first display device 108) of the dual-display computing device 100. A remaining portion (e.g., second set) of the components (e.g., 128, 130, 132, 134, 136) may be located in the second housing 104 (e.g., behind the second display device 110) of the dual-display computing device 100.

Figure 2:
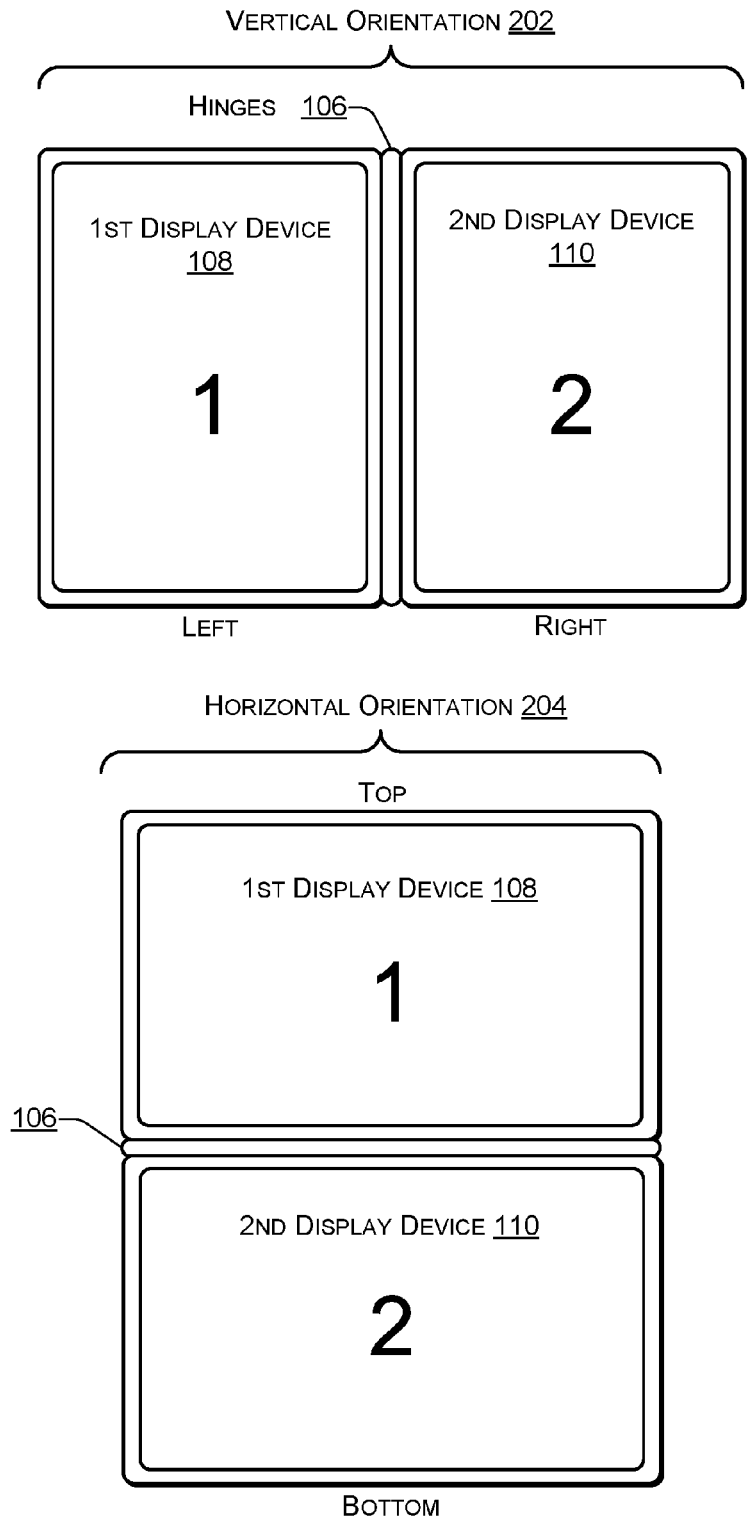
FIG. 2 is a block diagram illustrating different orientations of a dual-display device according to some embodiments.

FIG. 2 is a block diagram illustrating different orientations of a dual-display device (e.g., the computing device 100 of FIG. 1) according to some embodiments. The computing device 100 may include at least two display devices, the first display device 108 and the second display device 110.

The computing device 100 may be placed in a vertical (e.g., portrait) orientation 202 or a horizontal (e.g., landscape) orientation 204. For example, in the vertical orientation 202, the first display device 108 may be on one side (e.g., the left side or the right side), the second display device 110 may be on another side (e.g., the right side or the left side), and the hinges 106 may join the first display device 108 to the second display device 110. In the vertical orientation 204, the first display device 108 may be located at the top (or the bottom) of the computing device 100, with the hinges 106 in the middle, and the second display device 110 at the bottom (or the top) of the computing device.

Figure 3:
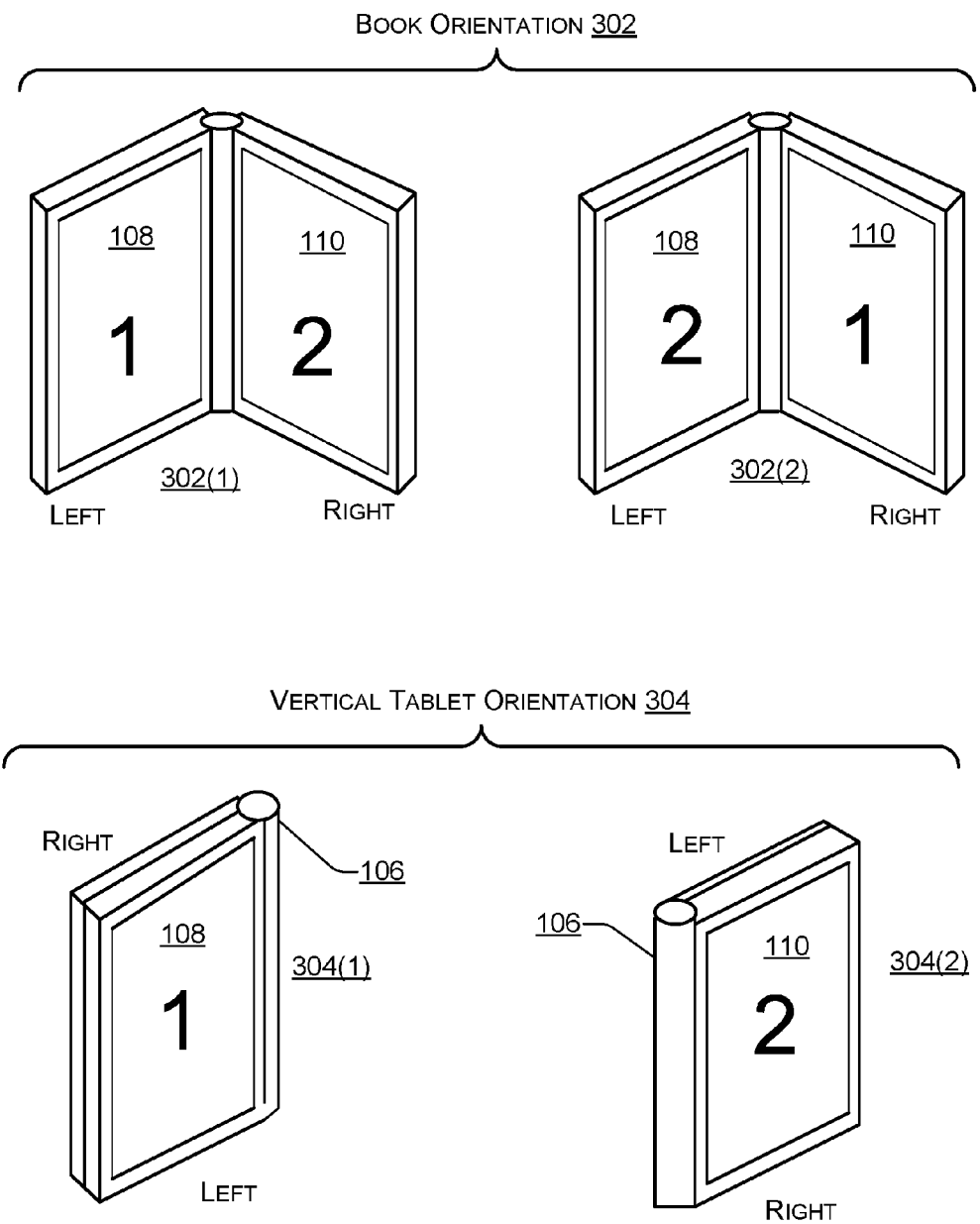
FIG. 3 is a block diagram illustrating vertical orientations of a dual-display device according to some embodiments.

FIG. 3 is a block diagram illustrating vertical orientations of a dual-screen device (e.g., the computing device 100 of FIG. 1) according to some embodiments. Examples of the vertical orientation 202 may include a book orientation 302 or a vertical tablet orientation 304. For example, in a first book orientation 302(1), the first display device 108 may be on the left and the second display device 110 may be on the right. Alternately, in a second book orientation 302(2), the second display device 110 may be on the left and the first display device 108 may be on the right.

In the vertical tablet orientation 304, the first display device 108 may be on the left and the second display device 110 may be on the right. In a first vertical tablet orientation 304(1), the first display device 108 may be facing a user and the second display device 110 may be rotated approximately 360 degrees to face away from the user. In a second vertical tablet orientation 304(2), the second display device 110 may be facing the user while the first display device 108 may rotated approximately 360 degrees to face away from the user.

Figure 4:
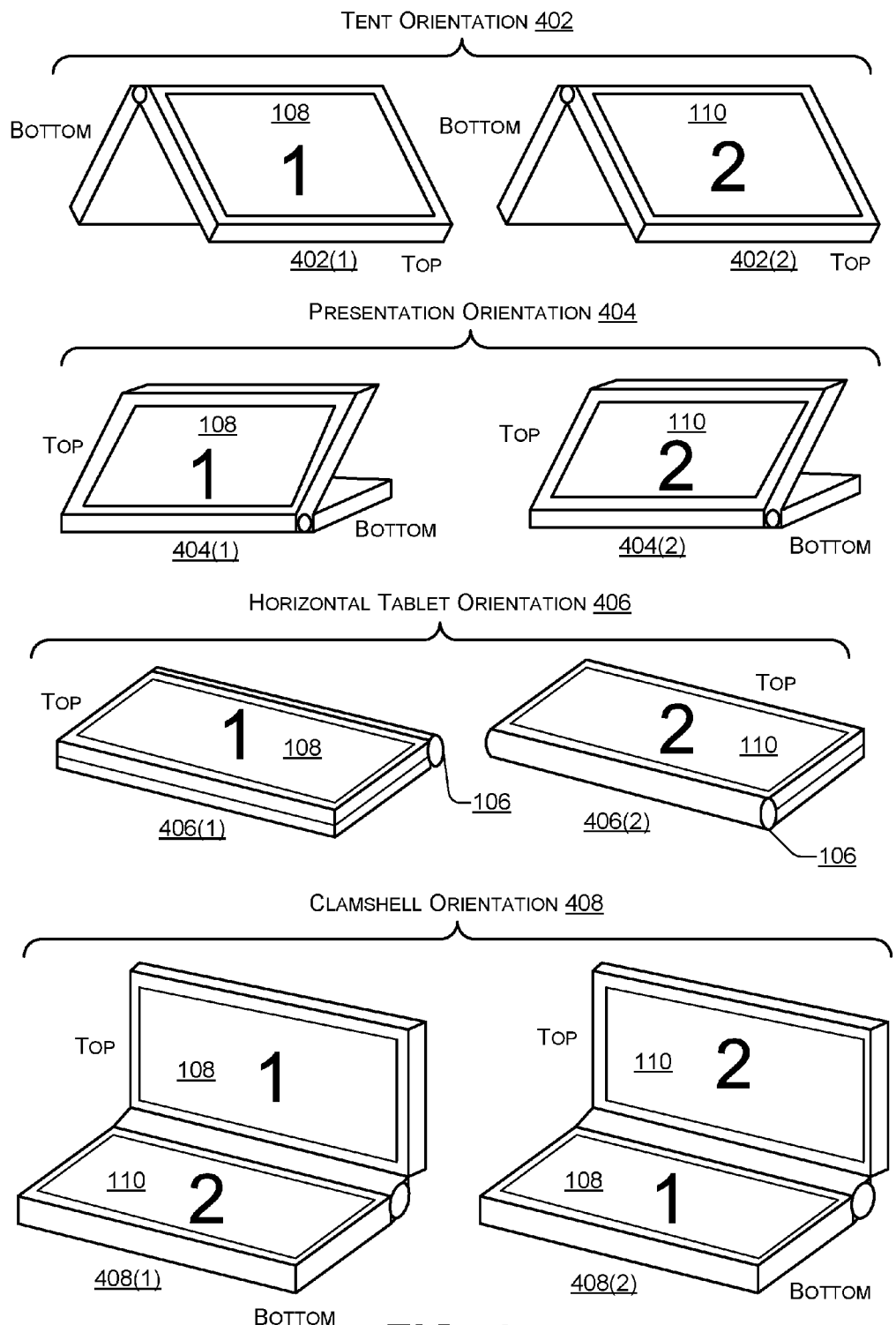
FIG. 4 is a block diagram illustrating horizontal orientations of a dual-display device according to some embodiments.

FIG. 4 illustrates horizontal orientations of a dual-screen device (e.g., the computing device 100 of FIG. 1) according to some embodiments. Examples of the horizontal orientation 404 may include a tent orientation 402, a presentation orientation 404, a horizontal tablet orientation 406, and a clamshell orientation 408.

In 402(1), the first display device 108 may be at the top facing the user while the second display device 110 may be at the bottom facing away from the user. In 402(2), the second display device 110 may be at the top facing the user and the first display device 108 may be at the bottom facing away from the user.

In 404(1), the first display device 108 may be at the top facing the user and the second display device 110 may be at the bottom facing down. In 404(2) the second display device 110 may be at the top facing the user and the first display device 108 may be at the bottom facing down.

In 406(1), the first display device 108 may be at the top facing the user and the second display device 110 may be at the bottom facing down (e.g., away from the user). In 406(2), the second display device 110 may be at the top facing the user and the first display device 108 may be at the bottom facing down (e.g., away from the user).

In 408(1), the first display device 108 may be at the top facing the user and the second display device 110 may be at the bottom facing the user (e.g., in a position where traditionally, a keyboard is located in a laptop). In 408(1), in some cases, a QWERTY-based keyboard may be displayed on the second display device 110 and used to receive keyboard input. In 408(2), the second display device 110 may be at the top facing the user and the first display device 108 may be at the bottom facing the user (e.g., in a position where traditionally, a keyboard is located in a laptop). In 408(2), in some cases, a QWERTY-based keyboard may be displayed on the first display device 108 and used to receive keyboard input.

Figure 5:
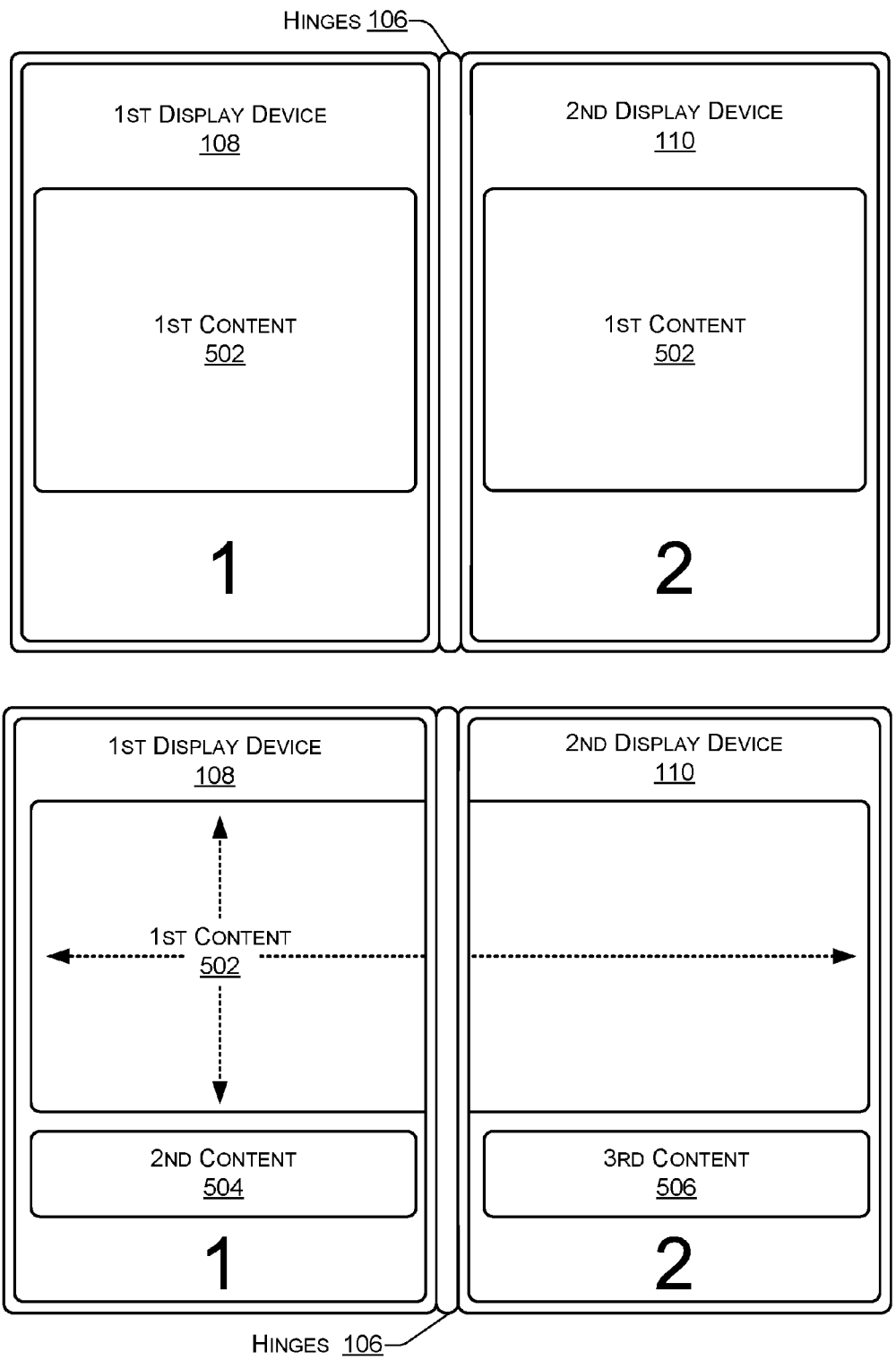
FIG. 5 is a block diagram illustrating different display modes of a dual-display device according to some embodiments.

FIG. 5 is a block diagram illustrating different display modes of a dual-display device (e.g., the computing device 100 of FIG. 1) according to some embodiments. The top half of FIG. 5 illustrates when a display mode of an operating system of the dual-display device is set to display content in a clone mode or in a single display mode. In the clone mode, first content 502 may be displayed both on the first display device 108 and on the second display device 110. In the single display mode, the first content 502 may be displayed on either (but not both) of the first display device 108 or the second display device 110.

The bottom half of FIG. 5 illustrates when a display mode of an operating system of the dual-display device is set to display content in an extended display mode, in which the second display device 110 is setup as an extension of the first display device 108. In the extended display mode, some content, such as the first content 502, may be displayed across both the first display device 108 and the second display device 110. In some cases, additional content may be displayed on either the first display device 108 or the second display device 110. For example, second content 504 may be displayed on the first display device 108 and third content 506 may be displayed on the second display device 110.

When the first display device 108 and the second display device 110 are placed at an angle of approximately 180-degrees relative to each other, the hinge 106 may operate to reduce a distance between (i) the right edge of the first display device 108 and (ii) the left edge of the second display device 110. In this way, the user may interact with the display devices 108, 110 in a manner similar to a single (e.g., contiguous) display device. For example, the hinge 106 may position the right edge of the first display device 108 about 4 mm or less from the left edge of the second display device 110.

Figure 6:
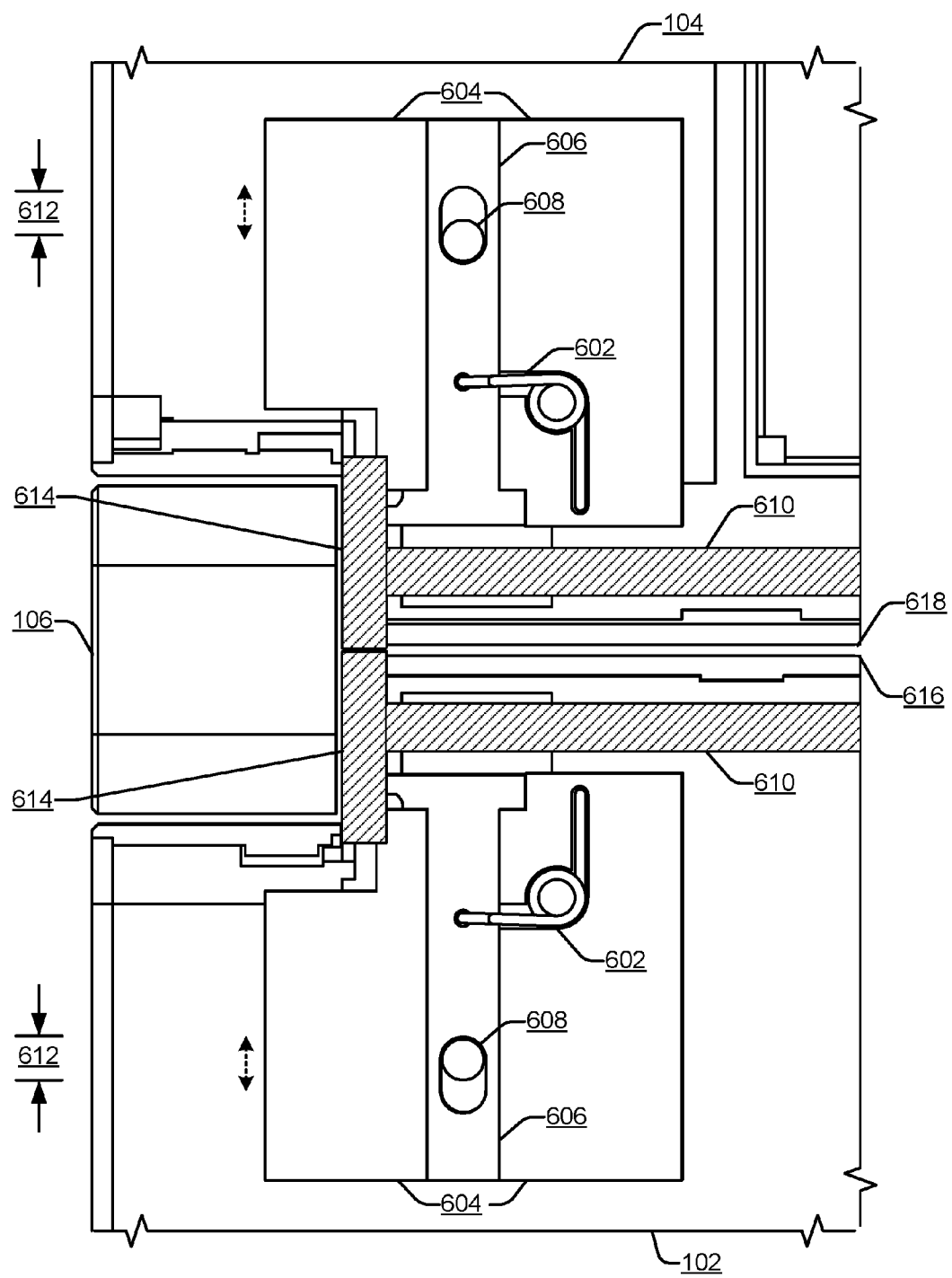
FIG. 6 is a block diagram of a hinge according to some embodiments.

FIG. 6 is a block diagram of a hinge (one of the hinges 106 of FIG. 1) according to some embodiments. A spring 602 is connected to a bracket holder 604 and to a bracket 606. The bracket holder 604 may slide up and down (in the orientation illustrated in FIG. 6) as the two housings 102, 104 are rotated, as illustrated by the arrow in FIG. 6. The bracket 606 may be fixed in place and may not move. A position pin 608 that is attached to the bracket holder 604 may slide back and forth within a slot (e.g., opening) in the bracket 606. The position pin 608 may position the bracket holder 604 relative to the bracket 604. The position pin 608 may be positioned as illustrated in FIG. 6 when the angle between the housings 102, 104 is about 180-degrees. The position pin 608 may move when the angle between the housings 102, 104 is about 0 degrees. The bracket holder 604 may move a distance 612 as the hinge 106 moves from 0 degrees to 180-degrees or from 180-degrees to 360 degrees. The distance 612 may be about 2 mm or less and preferably 1.5 mm or less. When the housings 102, 104 move to an angle of about 180 degrees relative to each other, a hinge edge 616 (e.g., an edge of a housing to which the hinge 106 is attached) of the first housing 102 and a hinge edge 618 of the second housing 104 may be pulled towards each other to reduce a gap between the housings 102, 104 to within less than a predetermined amount (e.g., preferably 4 mm or less and most preferably 2 mm or less). For example, in the 180-degree position, the hinge 1606 may pull the housings 102, 104 towards each other such that a distance between the hinge edge 616 (e.g., a first edge of the first housing) and the hinge edge 618 (e.g., a second edge of the second housing) is less than the predetermined amount (e.g., enabling a user to use the display devices 108, 110 of FIG. 1 in a manner similar to a single display device).

The hinge 106 may include a conduit or trough for one or more cables, such as a representative cable 610. The cable 610 may carry power, data signals, or both between components in the housing 102 and components in the housing 104.

The hinge 106 comprises a dual pivot hinge with two halves. Each half includes a slot for the hinge bracket holder 606 to slide, which enables the two halves of the hinge 106 to slide close together in the 180-degree position. The position of the hinge bracket 604 is driven by the two halves of the hinge 106 contacting each other with the aid of the torsion spring 602. Detents in the bracket holder 606 can be designed for certain positions (e.g., 0 degrees, 90 degrees, 180-degrees, 270 degrees, 360 degrees, and the like) to enable the user to place the housings 102, 104 at a particular angle and have the housings 102, 104 remain at the particular angle. For example, after the user places the housings 102, 104 at the particular angle, the housings 102, 104 may not change in angle due to minor jostling and incidental contact. The user may apply a minimum amount of force to overcome the detents and change the angle of the housings 102, 104. The dual pivot hinge 106 may slide between the housings 102, 104 to enable the display devices 108, 110 (of FIG. 1) to be relatively close (e.g., 4 mm or less) together, particularly in the 180-degree position.

When the hinge 106 is rotated from 0 to 180-degrees, the arms 614 may make contact with each other, thereby pushing the bracket holder 604 the distance 612 (e.g., the top bracket holder 604 may move up while the bottom bracket holder 604 may move down), causing the two housings 102, 104 to be positioned close to each other. In this way, the two display devices may be used as a single nearly contiguous display device.

Figure 7:
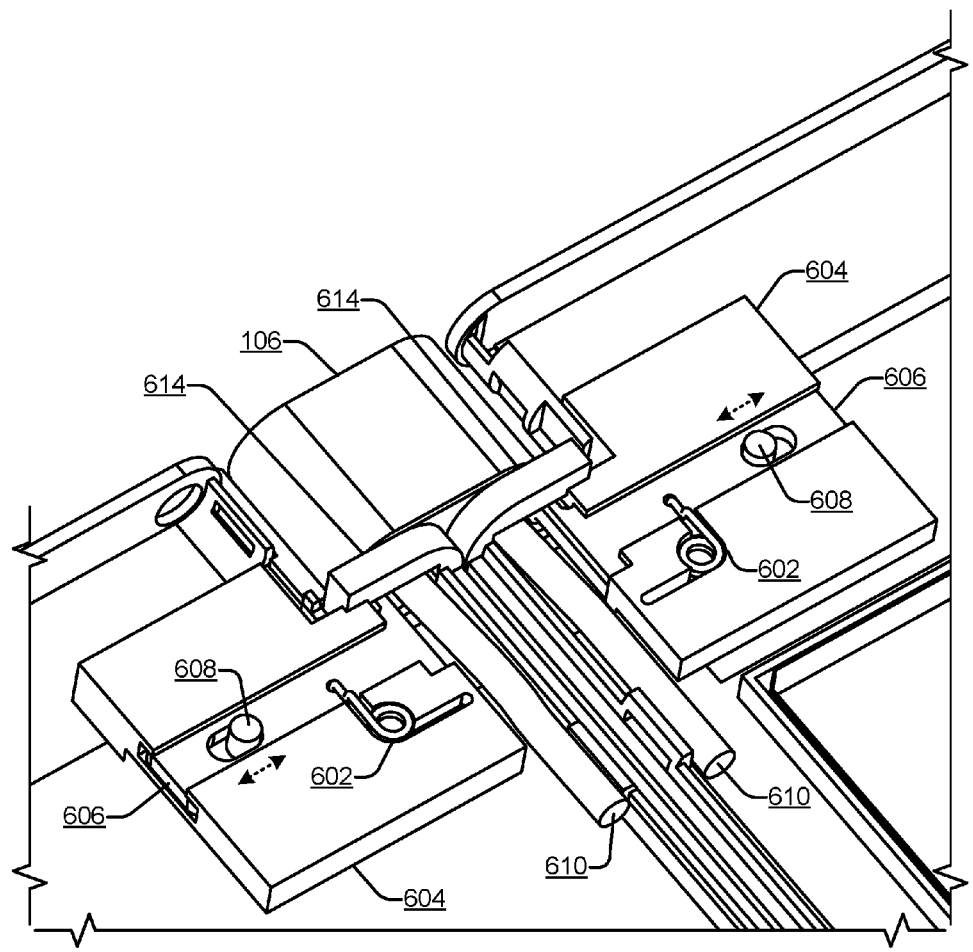
FIG. 7 is a block diagram of a particular view of components of a hinge according to some embodiments.

FIG. 7 is a block diagram of a particular view of components of a hinge according to some embodiments. FIG. 7 shows an upper side perspective to illustrate additional details of the hinge 106. The spring 602 is connected to the bracket holder 604 and to the bracket 606. The bracket holder 604 may slide as the two housings 102, 104 are rotated, as illustrated by the arrows. The bracket 606 may be fixed in place and may not move. The position pin 608 may be attached to the bracket holder 604 and may slide back and forth within a slot (e.g., opening) in the bracket 606. The position pin 608 may position the bracket holder 604 relative to the bracket 604. The position pin 608 may be positioned as illustrated in FIG. 7 when the angle between the housings 102, 104 is about 180-degrees. The position pin 608 may move when the angle between the housings 102, 104 is about 0 degrees. The bracket holder 604 may move the distance 612 as the hinge 106 moves from 0 degrees to 180-degrees or from 180-degrees to 360 degrees. The distance 612 may be about 2 mm or less and preferably 1.5 mm or less. The hinge 106 may include a conduit or trough for one or more cables, such as the cable 610, to carry power, data signals, or both between the two housings 102, 104.

The hinge 106 comprises a dual pivot hinge with two halves. Each half includes a slot for the hinge bracket holder 606 to slide, which enables the two halves of the hinge 106 to slide close together in the 180-degree position. The position of the hinge bracket 604 is driven by the two halves of the hinge 106 contacting each other with the aid of the torsion spring 602. Detents in the bracket holder 606 can be designed for certain positions (e.g., 0 degrees, 90 degrees, 180-degrees, 270 degrees, 360 degrees, and the like) to enable the user to place the housings 102, 104 at a particular angle and have the housings 102, 104 remain at the particular angle. For example, after the user places the housings 102, 104 at the particular angle, the housings 102, 104 may not change in angle due to minor jostling and incidental contact. The user may apply a minimum amount of force to overcome the detents and change the angle of the housings 102, 104.

When the hinge 106 is rotated from 0 to 180-degrees, the arms 614 may make contact with each other, thereby pushing the bracket holder 604 the distance 612 (e.g., the top bracket holder 604 may move up while the bottom bracket holder 604 may move down), causing the two housings 102, 104 to be positioned close to each other. In this way, the two display devices may be used as a single nearly contiguous display device.

Figure 8:
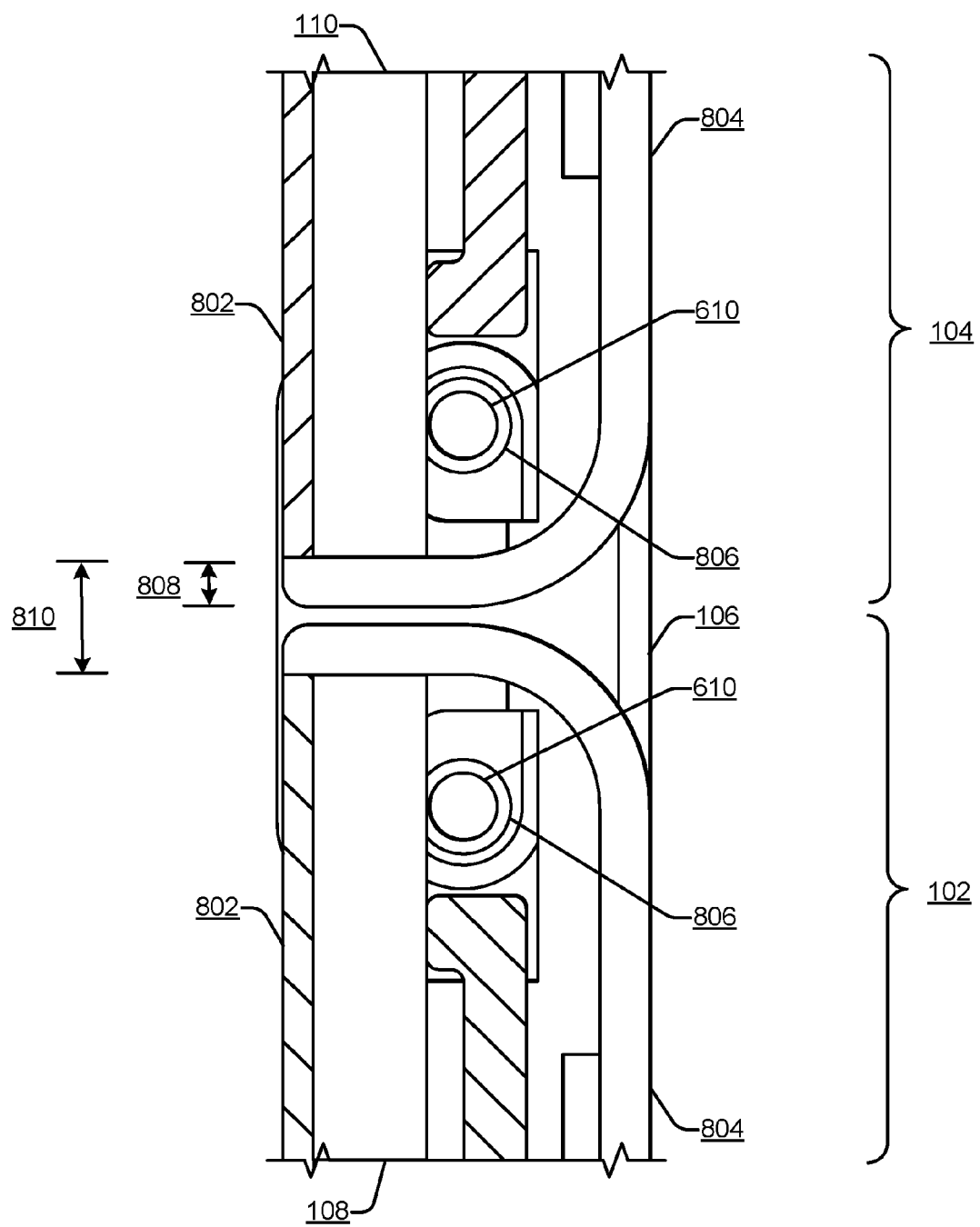
FIG. 8 is a block diagram illustrating a distance between two display devices in a 180-degree position according to some embodiments.

FIG. 8 is a block diagram illustrating a distance between two display devices in a 180-degree position according to some embodiments. In some cases, a glass surface 802 may be placed in front of the display devices 108, 110 (e.g., LCD, LED, OLED, e-ink, or the like). Each of the housings 102, 104 may include an outer case 804. The case 804 may be made from plastic (e.g., polycarbonate or the like), metal, glass, wood, or any combination thereof.

The hinge 106 may include one or more conduits 806 through which one or more cables 610 may be threaded. The cables 610 may carry (e.g., transmit) power, carry data signals, or both between components in the housing 102 and components in the housing 104.

As illustrated in FIG. 8, the display devices 108, 110 may not have a bezel on the side where the hinge 106 is attached (or the bezel may be very narrow). The distance between a visible edge of the display devices 108, 110 and an outer edge of the case 804 may be a distance 808. For example, the distance 808 may be 2 mm or less (preferably 1 mm or less). In the 180-degree position, the distance between an edge of the display device 108 and an edge of the display device 110 may be a distance 810. For example, the distance 810 may be 4 mm or less (preferably 2 mm or less). In this way, the display devices 108, 110 may appear to the user as a single (near contiguous) display device.

Figure 9:
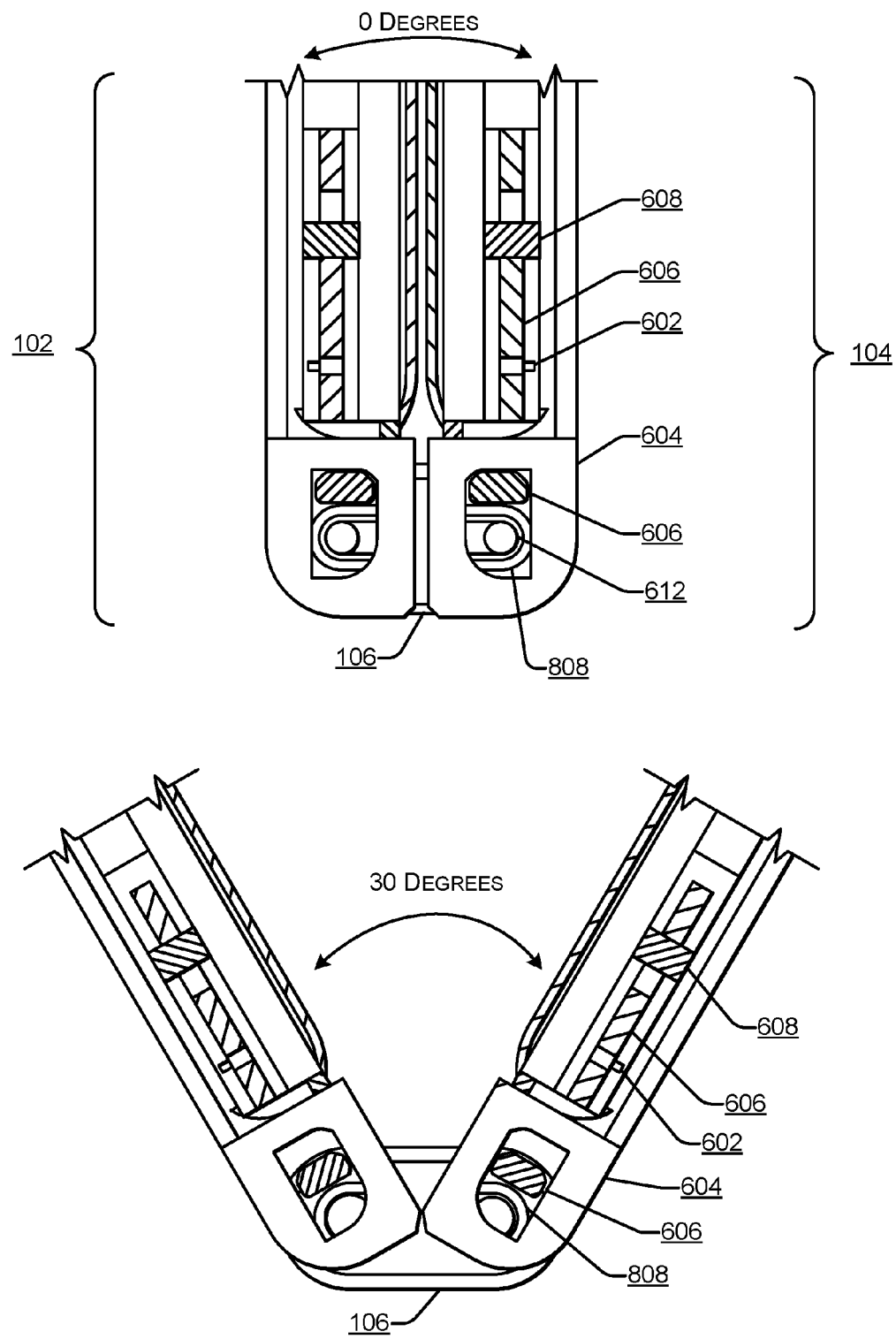
FIG. 9 is a block diagram of components of a hinge in in which two housings are positioned at approximately 0 degrees and approximately 30 degrees relative to each other according to some embodiments.

FIG. 9 is a block diagram of components of a hinge in in which two housings are positioned at approximately 0 degrees and approximately 30 degrees relative to each other according to some embodiments. FIG. 9 illustrates the movement of the various parts of the hinge 106 as the housings 102, 104 are moved from 0 degrees (top of FIG. 9) to about 30 degrees (bottom of FIG. 9) relative to each other. At about 30 degrees, the two bracket holders 604 begin to touch. Internally, in the hinge 106, the arms 614 begin to touch, putting pressure on the bracket holders 604 to move (e.g., slide) away from each other. The position pins 608 begin to move closer to each other.

Figure 10:
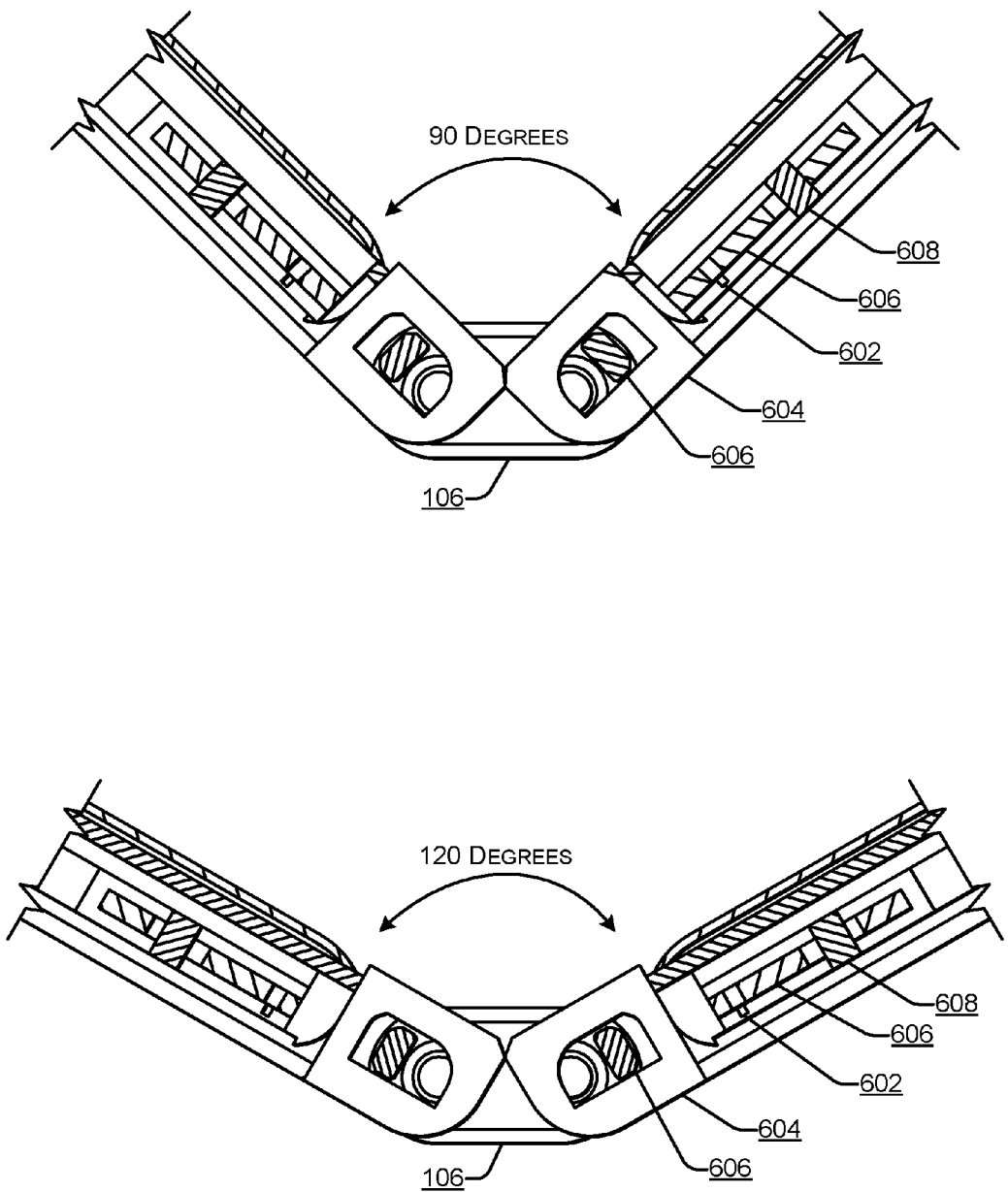
FIG. 10 is a block diagram of components of a hinge in in which two housings are positioned at approximately 90 degrees and approximately 120 degrees relative to each other according to some embodiments.

FIG. 10 is a block diagram of components of a hinge in in which two housings are positioned at approximately 90 degrees and approximately 120 degrees relative to each other according to some embodiments. FIG. 10 illustrates the movement of the various parts of the hinge 106 as the housings 102, 104 are moved from about 90 degrees (top of FIG. 10) to about 120 degrees (bottom of FIG. 10) relative to each other. At 90 degrees, the two bracket holders 604 are touching and internally (e.g., in the hinge 106), the arms 614 are putting pressure on the bracket holders 604 to move (e.g., slide) away from each other. The position pins 608 continue to move closer to each other. At 120 degrees, the two bracket holders 604 continue to touch. Internally (e.g., in the hinge 106), the arms 614 continue to put pressure on the bracket holders 604 to move (e.g., slide) away from each other. The position pins 608 continue to move closer to each other.

Figure 11:
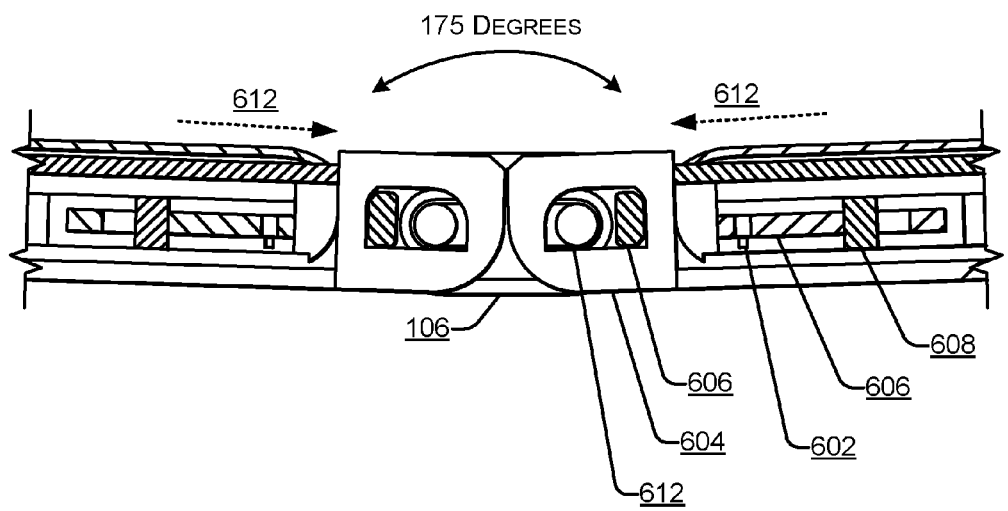
FIG. 11 is a block diagram of components of a hinge in in which two housings are positioned approximately 175 degrees relative to each other according to some embodiments.

FIG. 11 is a block diagram of components of a hinge in in which two housings are positioned approximately 175 degrees relative to each other according to some embodiments. At 175 degrees, the two bracket holders 604 continue to touch. Internally (e.g., in the hinge 106), the arms 614 have put enough pressure to slide the bracket holders 604 such that the position pins 608 have moved nearly as close as possible to each other (as compared to the 0-degree position).

Figure 12:
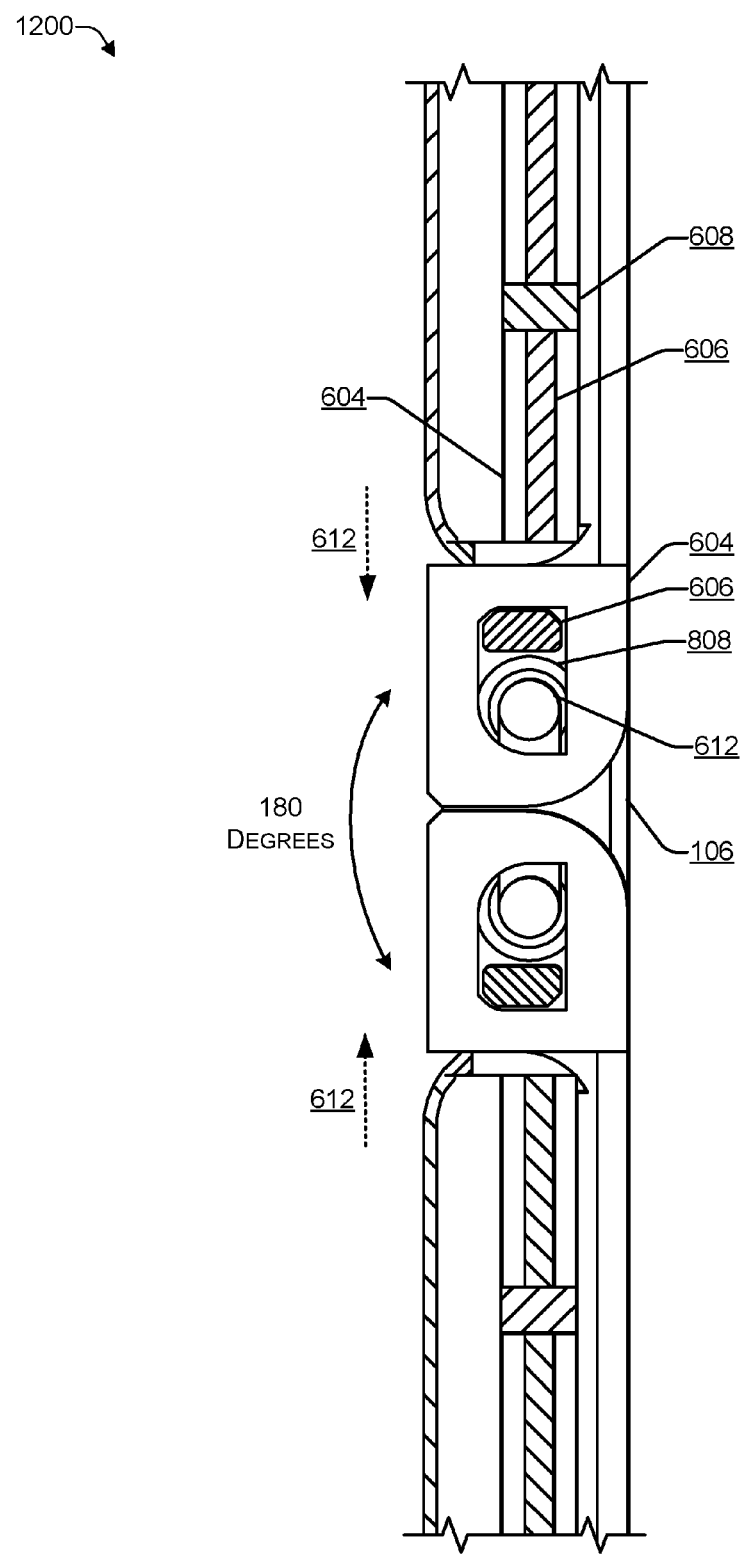
FIG. 12 is a block diagram of a hinge in which two housings are positioned at approximately 180-degrees relative to each other according to some embodiments.

FIG. 12 is a block diagram of a hinge in which two housings are positioned at approximately 180-degrees relative to each other according to some embodiments. At about 180 degrees, the two bracket holders 604 touch each other or almost (less than 1 mm distance) touch other. Internally (e.g., in the hinge 106), the arms 614 have caused the bracket holders 604 to move such that the position pins 608 have moved as close as possible to each other (as compared to the 0-degree position).

Figure 13:
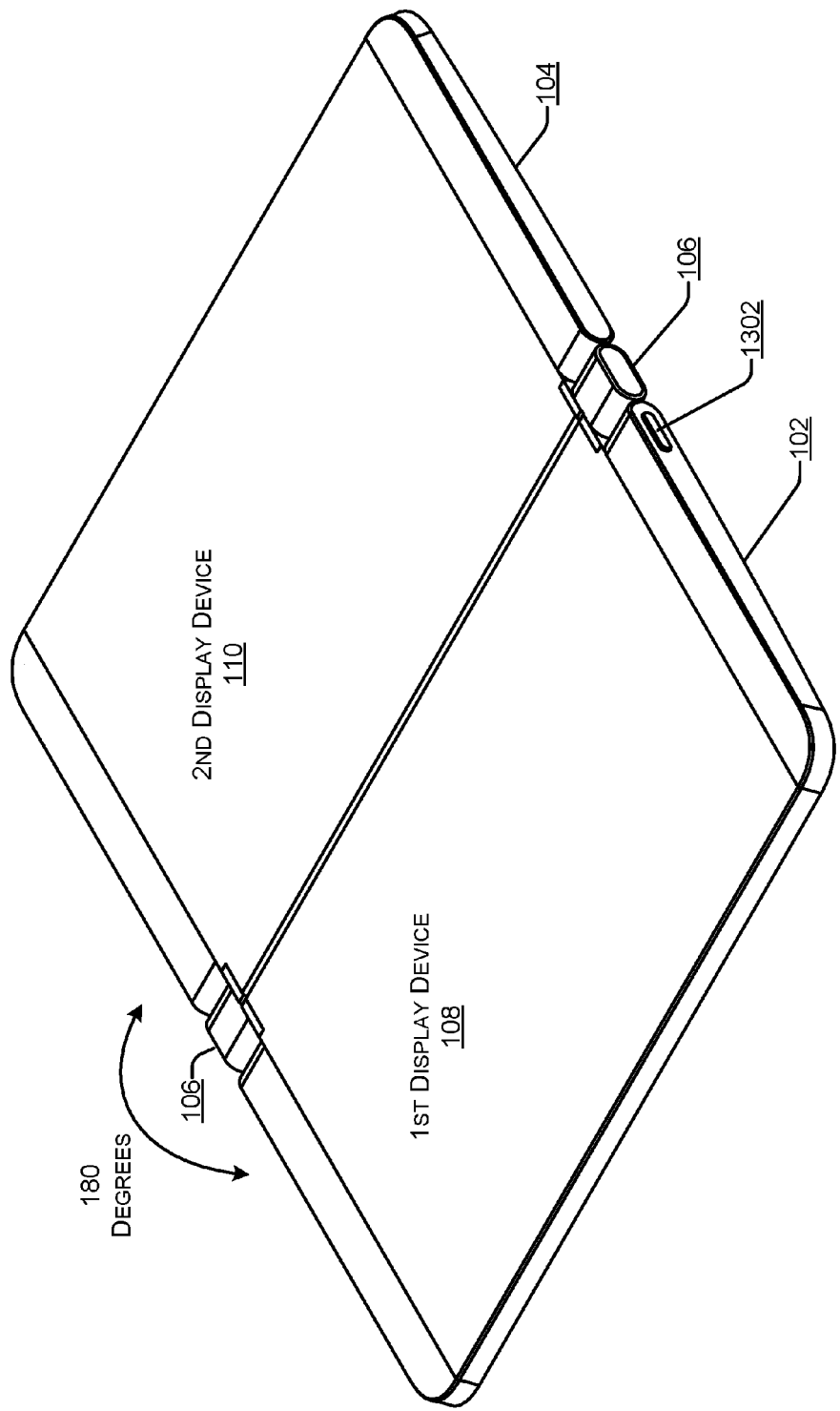
FIG. 13 is a block diagram of a computing device in which two housings are positioned at approximately 180-degrees relative to each other according to some embodiments.

FIG. 13 is a block diagram of a computing device in which two housings are positioned at approximately 180-degrees relative to each other according to some embodiments. FIG. 13 illustrates how the computing device appears when the housings 102, 104 are at an angle of about 180 degrees relative to each other.

In some cases, detents in the hinges 106 may be designed to temporarily hold the housings 102, 104 at certain angles, e.g., 0 degrees, 90 degrees, 180-degrees, 270 degrees, 360 degrees, and the like. The detents may enable the user to place the housings 102, 104 at a particular angle and have the housings 102, 104 remain at the particular angle.

The hinges 106 may include a locking mechanism that temporarily "locks" the housings 102, 104 after the housings 102, 104 have been placed at a particular angle (e.g., 0 degrees, 90 degrees, 180-degrees, 270 degrees, 360 degrees, and the like) relative to each other. For example, the bracket holders 604 (or the position pins 608) of FIG. 6 and FIG. 7 may be temporarily be locked in place. The temporary lock may enable the housings 102, 104 to remain at the particular angle even if the computing device 100 encounters minor jostling or the like. The user may press a button 1302 to unlock the locking mechanism and move the housings 102, 104 from a first angle to a second angle (e.g., the second angle is different from the first angle). For example, the computing device 100 may be locked in a closed position in which the housings 102, 104 are at about 0 degrees relative to each other, to enable the user to transport the computing device 100. The user may press the button 1302, causing the locking mechanism to unlock, enabling the user to move the housings 102, 104 to an open position. For example, the user may press the button 1302 and move the housings 102, 104 from 0 degrees to about 180 degrees relative to each to use the display devices 108, 110 as if they were a single display device. While the button 1302 is illustrated in FIG. 13 as being at the bottom of the first housing, the button 1302 may be located at the bottom or the top of either housing 102 or 104. The button 1302 may be located close to one of the hinges 106 to enable the button to easily interact with the locking mechanism.

Figure 14:
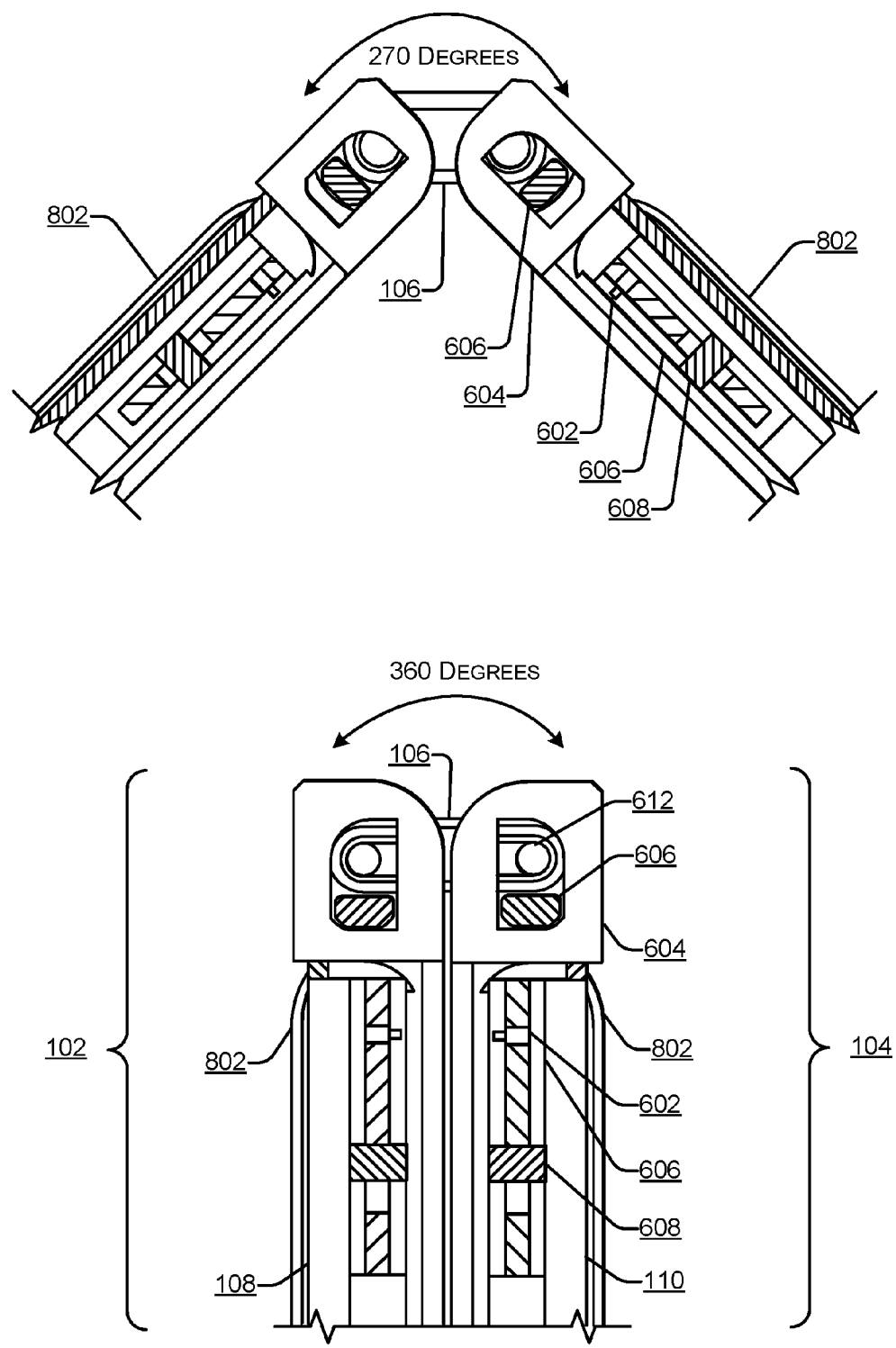
FIG. 14 is a block diagram of a computing device in which two housings are positioned at approximately 270-degrees and approximately 360-degrees relative to each other according to some embodiments.

FIG. 14 is a block diagram of a computing device in which two housings are positioned at approximately 270-degrees and approximately 360-degrees relative to each other according to some embodiments. FIG. 14 illustrates the movement of the various parts of the hinge 106 as the housings 102, 104 are moved from about 270 degrees (top of FIG. 14) to about 360 degrees (bottom of FIG. 14) relative to each other. Internally (e.g., in the hinge 106), the arms 614 may reduce the amount of pressure applied to allow the bracket holders 604 to slide such that the position pins 608 move further apart as the angle increases from 180 to 270 and then 360.

Figure 15:
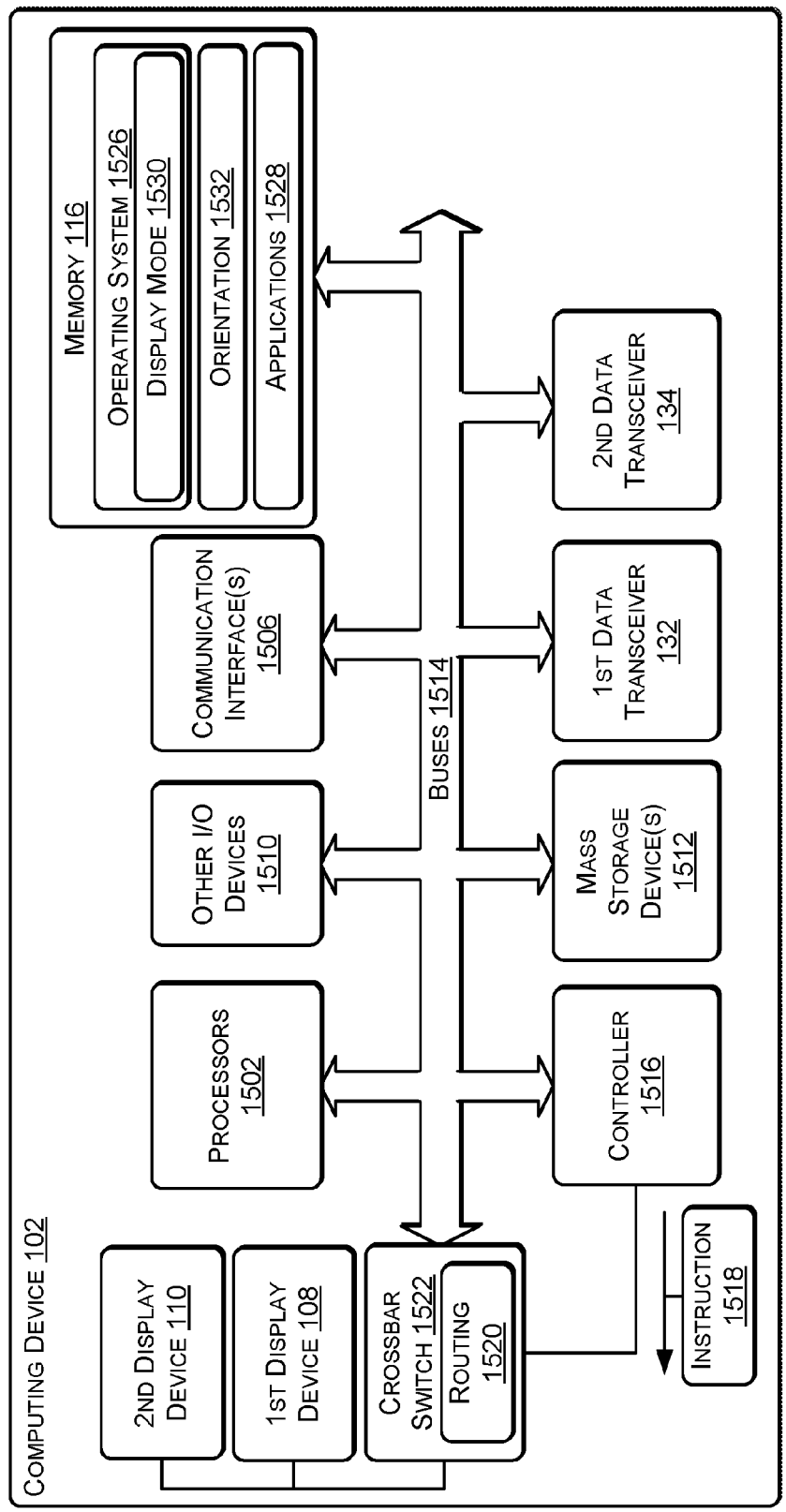
FIG. 15 illustrates an example configuration of a computing device that can be used to implement the systems and techniques described herein.

FIG. 15 illustrates an example configuration of the computing device 100 of FIG. 1 that can be used to implement the systems and techniques described herein. The computing device 100 may include one or more processors 1502 (e.g., the CPU 112 and the GPU 114 of FIG. 1), the memory 116, communication interfaces 1506 (e.g., the I/O ports 120, 128), the display devices 108, 110, other input/output (I/O) devices 1510 (e.g., keyboard, trackball, and the like), and one or more mass storage devices 1512 (e.g., disk drive, solid state drive, or the like), configured to communicate with each other, such as via one or more system buses 1514 or other suitable connection. While a single bus 1514 is illustrated for ease of understanding, it should be understood that the system buses 1514 may include multiple buses, such as memory device buses, storage device buses, data buses, video signal buses, and the like.

The processors 1502 are one or more hardware devices that may include a single processing unit or a number of processing units, all of which may include single or multiple computing units or multiple cores. The processors 1502 may include the GPU 114 integrated into the CPU 112 or the GPU 114 may be a separate processor device from the CPU 112. The processors 1502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1502 may be configured to fetch and execute computer-readable instructions stored in the memory 116, mass storage devices 1512, or other computer-readable media.

Memory 116 and mass storage devices 1512 are examples of non-transitory computer media (e.g., memory storage devices) for storing instructions that can be executed by the processors 1502 to perform the various functions described herein. For example, memory 116 may include both volatile memory and non-volatile memory (e.g., RAM, ROM, or the like) devices. Further, mass storage devices 1512 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1512 may be collectively referred to as memory or computer storage media herein, and may be a non-transitory media capable of storing computer-readable, processor-executable program instructions as computer program code that can be executed by the processor 1502 as a particular machine configured for carrying out the operations and functions described in the implementations herein.

The computing device 100 may also include one or more communication interfaces 1506 for exchanging data via a network. The communication interfaces 1506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1506 can also provide communication with external storage (not shown), such as in a storage array, network attached storage, storage area network, or the like. The display devices 108, 110 may be connected to each other using one or more hinges (e.g., the hinges 106 of FIG. 1) that enable each display device to be placed at an angle relative to the other display device. For example, the display devices 108, 110 may be used for displaying information and images to users. Other I/O devices 1510 may be devices that receive various inputs from a user and provide various outputs to the user, and may include a keyboard, a remote controller, a mouse, a printer, audio input/output devices, and so forth.

The computer storage media, such as memory 116 and mass storage devices 1512, may be used to store software and data. For example, the computer storage media may be used to store an operating system 1526 and software applications 1528. The operating system 1526 may be set to a particular display mode 1530. For example, the operating system 1526 may have a default display mode and a user may set the display mode 1530 to something different than the default display mode. The display mode 1530 may be one of (1) an extended display mode (e.g., see bottom of FIG. 5), (2) a single display mode (e.g., see top of FIG. 5), or (3) a clone mode (e.g., see top of FIG. 5). The computer storage media may store an orientation 1532 (e.g., vertical orientation, horizontal orientation, or other orientation described herein, such as in FIGS. 2, 3, and 4), and one or more software applications 1528. The software applications 1528 may display the content 502, 504, 506 of FIG. 5 and may include a word processing application, a spreadsheet application, and the like.

Based on the display mode 1530 and the orientation 1532, the controller 1516 may select a routing 1520 from one of multiple routings (e.g., normal, swap, eDP only, or DP only) associated with a crossbar switch 1522. The controller 1516 may modify the content 1522 to create modified content. The modified content may be routed by the crossbar switch 1522 to one or both of the display devices 108, 110 according to the selected routing 1520.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   a first housing comprising:
      a first display device;
   a second housing comprising:
      a second display device; and
   one or more hinges coupling the first housing to the second housing to enable the first housing to be placed at an angle of between about 0 degrees to about 360 degrees relative to the second housing, wherein an individual hinge of the one or more hinges comprises:
      a first bracket attached to the first housing;
      a second bracket attached to the second housing;
      a first spring attached to the first bracket and to a first bracket holder;
      a second spring attached to the second bracket and to a second bracket holder;
      a first position pin attached to the first bracket holder, wherein the first position pin moves within a first slot in the first bracket based on the angle between the first housing and the second housing; and
      a second position pin attached to the second bracket holder, wherein the second position pin moves within a second slot in the second bracket based on the angle between the first housing and the second housing;
   wherein placing the first housing at an angle of about 180 degrees relative to the second housing causes:
      the first spring to pull a first edge of the first housing a predetermined distance towards the second housing; and
      the second spring to pull a second edge of the second housing the predetermined distance towards the first housing.

2. The computing device of claim 1, wherein placing the first housing at the angle of about 180 degrees relative to the second housing causes a gap between the first edge of the first housing and a second edge of the second housing to be no more than 2 millimeters.

3. The computing device of claim 1, wherein a gap between a first particular edge of the first display device and a second particular edge of the second display device is 4 millimeters or less.

4. The computing device of claim 1, wherein an individual hinge of the one or more hinges comprises:
   one or more conduits; and
   at least one cable routed through the one or more conduits.

5. The computing device of claim 4, wherein:
   the at least one cable carries power from a power source in the second housing to a first set of components in the first housing.

6. The computing device of claim 4 wherein:
   the at least one cable carries one or more data signals between a first set of components in the first housing and a second set of components in the second housing.

7. The computing device of claim 4, wherein the individual hinge further comprises:
   a plurality of detents to enable the first housing to be placed at an angle relative to the second housing, wherein the angle includes at least one of about 0 degrees, about 90 degrees, about 180 degrees, or about 360 degrees.

8. A computing device comprising:
   a first housing comprising:
      a first display device;
   a second housing comprising:
      a second display device; and
   at least one hinge coupling the first housing to the second housing, wherein the at least one hinge enables the first housing to be placed at an angle of between about 0 degrees to about 360 degrees relative to the second housing, wherein the at least one hinge comprises:
      a first bracket attached to the first housing;
      a second bracket attached to the second housing;
      a first spring attached to the first bracket and to a first bracket holder;
      a second spring attached to the second bracket and to a second bracket holder;
      a first position pin attached to the first bracket holder, wherein the first position pin moves within a first slot in the first bracket based on the angle between the first housing and the second housing; and
      a second position pin attached to the second bracket holder, wherein the second position pin moves within a second slot in the second bracket based on the angle between the first housing and the second housing; and
   wherein placing the first housing at an angle of about 180 degrees relative to the second housing causes:
      the first spring to exert a predetermined amount of force on the first bracket holder to pull a first edge of the first housing a predetermined distance towards the second housing; and
      the second spring to exert the predetermined amount of force on the second bracket holder to pull a second edge of the second housing the predetermined distance towards the first housing.

9. The computing device of claim 8, wherein the at least one hinge comprises:
   one or more conduits; and
   at least one cable routed through the one or more conduits.

10. The computing device of claim 9, wherein the at least one cable carries power from a power source in the second housing to a first set of components in the first housing.

11. The computing device of claim 9, wherein the at least one cable carries one or more data signals between a first set of components in the first housing and a second set of components in the second housing.

12. The computing device of claim 8, wherein the at least one hinge comprises:
   a plurality of detents associated with when the angle between the first housing and the second housing is one of about 0 degrees, about 90 degrees, about 180 degrees, and about 360 degrees.

13. The computing device of claim 8, wherein the at least one hinge comprises:
   a locking mechanism to enable the at least one hinge to temporarily lock a first particular angle between the first housing and the second housing; and
   a button used to unlock the locking mechanism when changing the angle between the first housing and the second housing from the first particular angle to a second particular angle.

14. A computing device comprising:
   a first housing comprising:
      a first set of components;
   a second housing comprising:
      a second set of components; and
   one or more hinges to couple the first housing to the second housing, wherein the one or more hinges enable the first housing and the second housing to be placed at an angle of between about 0 degrees to about 360 degrees relative to each other,
      wherein an individual hinge of the one or more hinges comprises:

a first bracket attached to the first housing;
a second bracket attached to the second housing;
a first spring attached to the first bracket and to a first bracket holder;
a second spring attached to the second bracket and to a second bracket holder;
a first position pin attached to the first bracket holder, wherein the first position pin moves within a first slot in the first bracket based on the angle between the first housing and the second housing; and
a second position pin attached to the second bracket holder, wherein the second position pin moves within a second slot in the second bracket based on the angle between the first housing and the second housing
wherein placing the first housing at an angle of about 180 degrees relative to the second housing causes:
the first spring to pull a first edge of the first housing a predetermined distance towards the second housing; and
the second spring to pull a second edge of the second housing the predetermined distance towards the first housing.

15. The computing device of claim 14, wherein placing the first housing and the second housing at an angle of about 180 degrees relative to each other causes:
the first spring to exert a predetermined amount of force on the first bracket holder; and
the second spring to exert the predetermined amount of force on the second bracket holder.

16. The computing device of claim 14, wherein:
the first set of components comprises:
a graphics processing unit (GPU); and
a first display device connected to an embedded DisplayPort (eDP) output of the GPU; and
the second set of components comprises:
a second display device connected to a DisplayPort (DP) output of the GPU.

17. The computing device of claim 14, wherein an individual hinge of the one or more hinges comprises:
one or more conduits; and
at least one cable routed through the one or more conduits.

18. The computing device of claim 17, wherein the at least one cable carries power from a power source in the second housing to a first set of components in the first housing.

19. The computing device of claim 17, wherein the at least one cable carries one or more data signals between a first set of components in the first housing and a second set of components in the second housing.

20. The computing device of claim 18, wherein the individual hinge further comprises:
a locking mechanism to enable the one or more hinges to be temporarily locked at a first particular angle between the first housing and the second housing; and
a button to unlock the locking mechanism when changing the angle between the first housing and the second housing from the first particular angle to a second particular angle.

\* \* \* \* \*